(12) United States Patent
Cui (10) Patent No.: US 6,676,571 B2
(45) Date of Patent: Jan. 13, 2004

(54) BICYCLE TRAINER

(75) Inventor: Xiao Hong Cui, Taipei Hsien (TW)

(73) Assignee: Ming Tung Yu, Taipei Hsien (TW)

( * ) Notice: Subject to any disclaimer, the term of this patent is extended or adjusted under 35 U.S.C. 154(b) by 0 days.

(21) Appl. No.: 10/141,061

(22) Filed: May 9, 2002

(65) Prior Publication Data

US 2003/0211917 A1 Nov. 13, 2003

(51) Int. Cl.⁷ .............................................. A63B 71/00
(52) U.S. Cl. ............................ 482/51; 482/52; 482/62; 280/1.175; 280/828
(58) Field of Search ............................. 482/51, 57, 62, 482/63; 280/828, 1.183, 1.175, 220, 278

(56) References Cited

U.S. PATENT DOCUMENTS 4,124,222 A * 11/1978 Moe et al. ................. 280/221
4,182,522 A * 1/1980 Ritchie ....................... 280/278
6,471,230 B2 * 10/2002 Ellsworth et al. ........... 280/284

* cited by examiner

*Primary Examiner*—Nicholas D. Lucchesi
*Assistant Examiner*—Tam Nguyen
(74) *Attorney, Agent, or Firm*—Rosenberg, Klein & Lee (57) ABSTRACT

The bicycle trainer includes a frame having a head tube, a top tube, and a rear fork, wherein a foot bar and a front fork are mounted at a lower part of the head tube, a front part of the top tube is pivotally connected to the head tube, and the rear fork is connected to the top tube; a handle connected to the front fork of the frame and properly connected to the front fork; a front wheel and a rear wheel pivotally connected to front wheel and rear wheel; and a flexible device connecting the frame with a rear pivot shaft at one side of the rear wheel, wherein the flexible device drive the rear wheel to rotate and is recovered by using a swirling spring installed at the other side of the rear wheel.

8 Claims, 11 Drawing Sheets

BICYCLE TRAINER

BACKGROUND OF THE INVENTION

1. Field of the Invention

The present invention relates to a bicycle trainer. More particularly, the present invention relates to a foldable bicycle trainer that is a combination of a bicycle for transportation and an excise machine.

2. Description of the Prior Art

With the development of the society, more and more new-fashioned transport devices appear and traffic itself becomes more and more advanced. However, the traditional bicycles do not have undergone great developments instead.

The conventional bicycle is operated such that the crank-like pedals fixed at both sides of a shaft of the sprocket with a phase difference of 180 degree are stepped on by a rider. The pedal lever is rotated around the shaft of the sprocket to attain rotating force of the sprocket and this rotating force of the sprocket is transmitted to the rear wheel through the chain. In addition to the transportation purpose, some people use the bicycle to strengthen the power of the body. However, as known in the art, riding the conventional bicycle can only strengthen lower portion of one's body such as his legs.

In urban area, people have a desire for bicycles to occupy minimum spaces if it is possible due to the limited space available in such environments. It is also expected that bicycles could be made to consume a minimum volume for convenience. On the other hand, bicycles must meet people's need for riding and loading, therefore, the size cannot be reduced much below that of conventional machines. This therefore, requires that bicycles that can be folded.

SUMMARY OF THE INVENTION

It is a primary object of the present invention to provide a muscle trainer that is also used as a transportation means.

Another objective of the present invention is to provide a bicycle trainer which is a combination of a bicycle and a excise machine.

Another objective of the present invention is to provide a bicycle trainer. When a rider needs to go to somewhere, he or she can take excises on the way to his destination.

According to the claimed invention, a bicycle trainer is provided. The bicycle trainer comprises: a frame comprising a head tube, a top tube, and a rear fork, wherein a foot bar and a front fork are mounted at a lower part of the head tube, a front part of the top tube is pivotally connected to the head tube, and the rear fork is connected to the top tube; a handle connected to the front fork of the frame and properly connected to the front fork; a seat mounted at a proper position over the top tube of the frame; a front wheel and a rear wheel pivotally connected to front wheel and rear wheel by means of a front pivot shaft and a rear pivot shaft respectively, wherein the distance between the front wheel and rear wheel is changeable; and a flexible device connecting the frame with a rear pivot shaft at one side of the rear wheel, wherein the flexible device drive the rear wheel to rotate and is recovered by using a swirling spring installed at the other side of the rear wheel.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
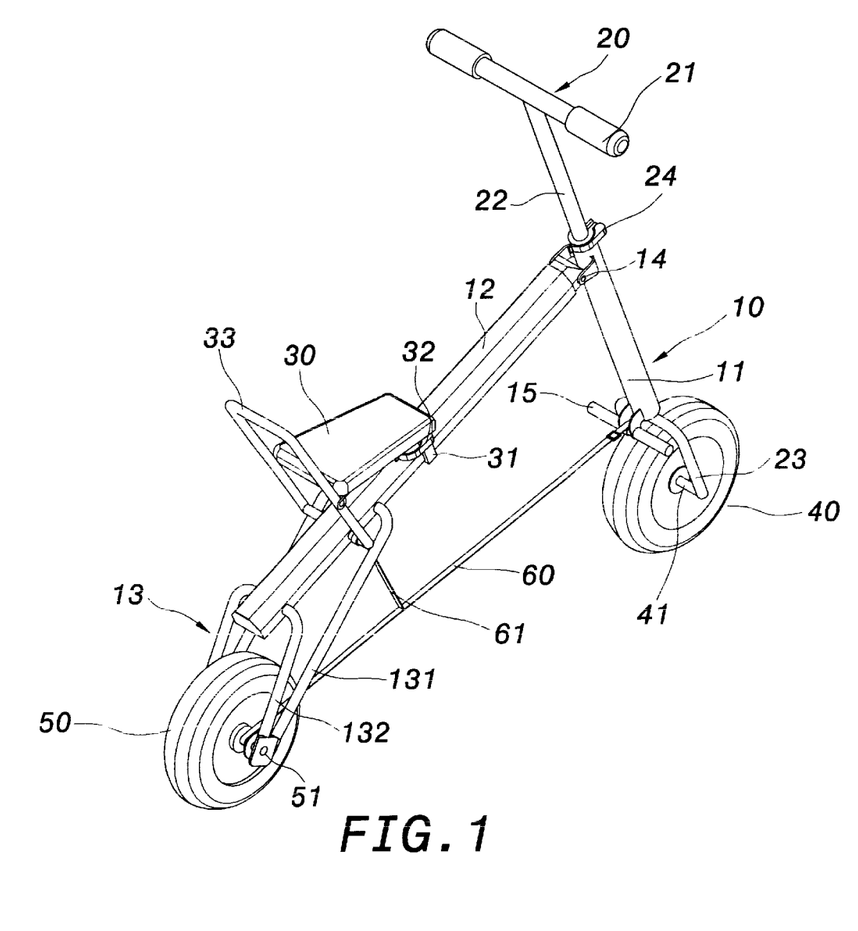
FIG. 1 is a perspective view of this invention.
Figure 2:
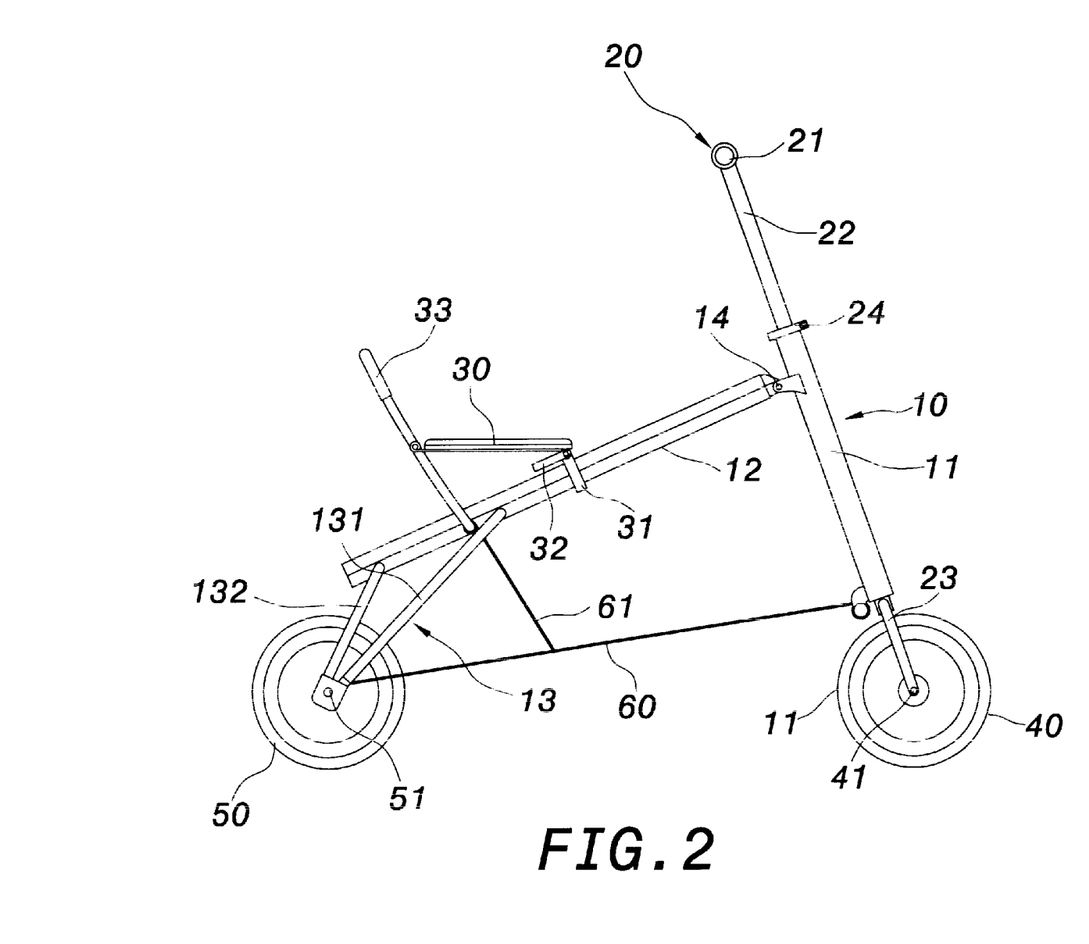
FIG. 2 is a side view of this invention.

Please refer to FIG. 1 and FIG. 2. The present invention provides a bicycle trainer. The bicycle trainer comprises a frame 10, a handle 20, a seat 30, a front wheel 40, a rear wheel 50, and a flexible device 60. The frame 10 comprises a head tube 11, a top tube 12, and a rear fork 13. The head tube 11, top tube 12, and rear fork 13 are made of metals. The head tube 11 has a hollow structure and is connected with a foot bar 15 for resting a rider's feet. An upper end of the top tube 12 is pivotally connected to an upper part of the head tube 11 by a pivot means 14. The rear fork 13 consists of two approximate U-shaped rod bodies 131 and 132. The rod bodies 131 and 132 are both embedded in a rear part of the top tube 12.

The handle 20 includes two handle bars 21 which are connected to a connecting rod 22. The connecting rod 22 is inserted into the head tube 11 of the frame 10. A front fork 23 is rotatably connected to a bottom end of the head tube 11 of the frame 10. Specifically, not explicitly shown in figures, a bottom end of the connecting rod 22 is connected with the front fork 23 so that a rider can control the direction of the front wheel 40 through the handle 20. Near the upper end of the head tube 11, a fast-disassembly device 24, which is capable of properly positioning the connecting rod 22 on the head tube 11, is also provided.

The seat 30 is moveably installed on the top tube 12 of the frame 10. A sliding sleeve assembly 31 is fixed on a bottom surface of the seat 30 and is preferably provided at a front part of the seat 30. The sliding sleeve assembly 31 slides along the length of the top tube 12 of the frame 10. Likewise, a fast-disassembly device 32 is provided on the sliding sleeve assembly 31. The fast-disassembly device 32 can properly position the sliding sleeve assembly 31 on the top tube 12. A back support structure 33 is pivotally connected with a rear side of the seat 30. Preferably, the back support structure 33 has a rectangular frame with its lower side pivotally penetrating the top tube 12 of the frame 10, as illustrated.

Figure 2A:
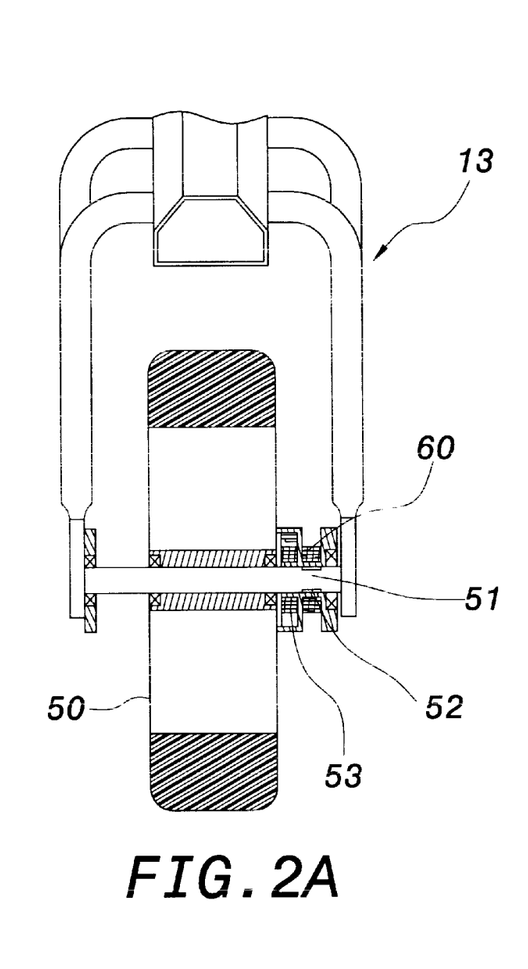
FIG. 2A is a partial cross-sectional view of this invention.

The front wheel 40 and the rear wheel 50 are pivotally installed on the front fork 23 and the rear fork 13 with a front pivot shaft 41 and a rear pivot shaft 51, respectively. The distance between the front wheel 40 and the rear wheel 50, i.e., the distance between the front fork 23 and the rear fork 13, is changeable. As shown in FIG. 2A, a one-direction drive mechanism 52 is provided between the rear wheel 50 and the rear pivot shaft 51. The rear pivot shaft 51 drives the rear wheel 50 to rotate in one direction or in a forward direction. When the rear pivot shaft 51 rotates in a reverse direction, it is in a free-turning status and will not drive the rear wheel 50.

The flexible device 60 may be an elastic belt. One end of the flexible belt 60 is mounted at a bottom part of the head tube 11 of the frame 10. The other end of the flexible belt 60 is mounted on the rear pivot shaft 51 and is properly swirled on the rear pivot shaft 51 at one side of the rear wheel 50. A swirling spring 53 is mounted on the rear pivot shaft 51. By the swirling force provided by the swirling spring 53, the rear pivot shaft 51 can turn in a reverse direction, thereby enabling a re-wrapping of the rear pivot shaft 51 by the flexible belt 60. A positioning device 61 may be provided between the top tube 12 of the frame 10 and the flexible belt 60. The positioning device 61 is flexible with its one end connected to the top tube 12 and the other end connected to a middle portion of the flexible belt 60. In use, the positioning device 61 can keep the flexible belt in position against the gravity.

Figure 3:
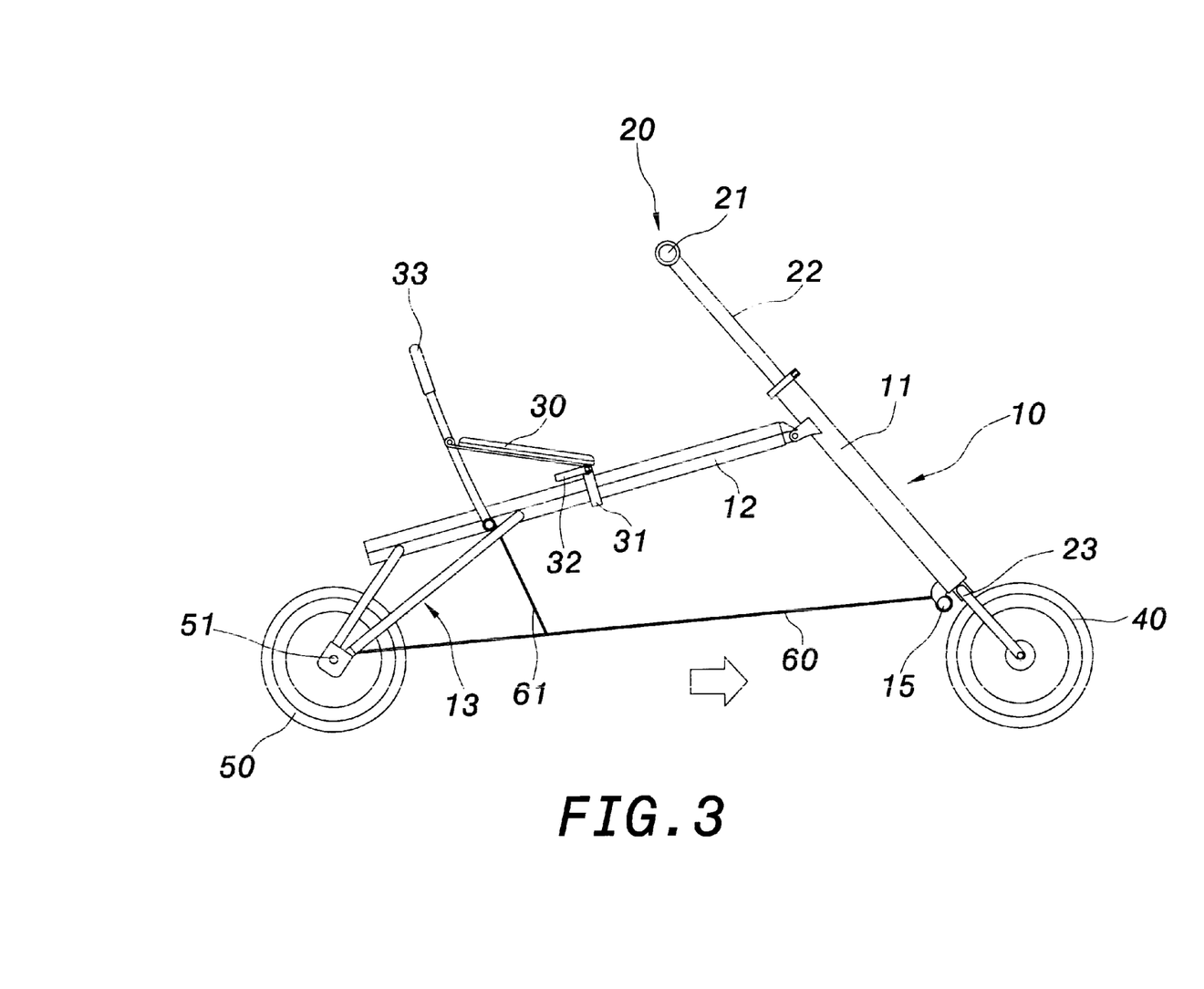
FIG. 3 is a schematic diagram showing the use of this invention.
Figure 3A:
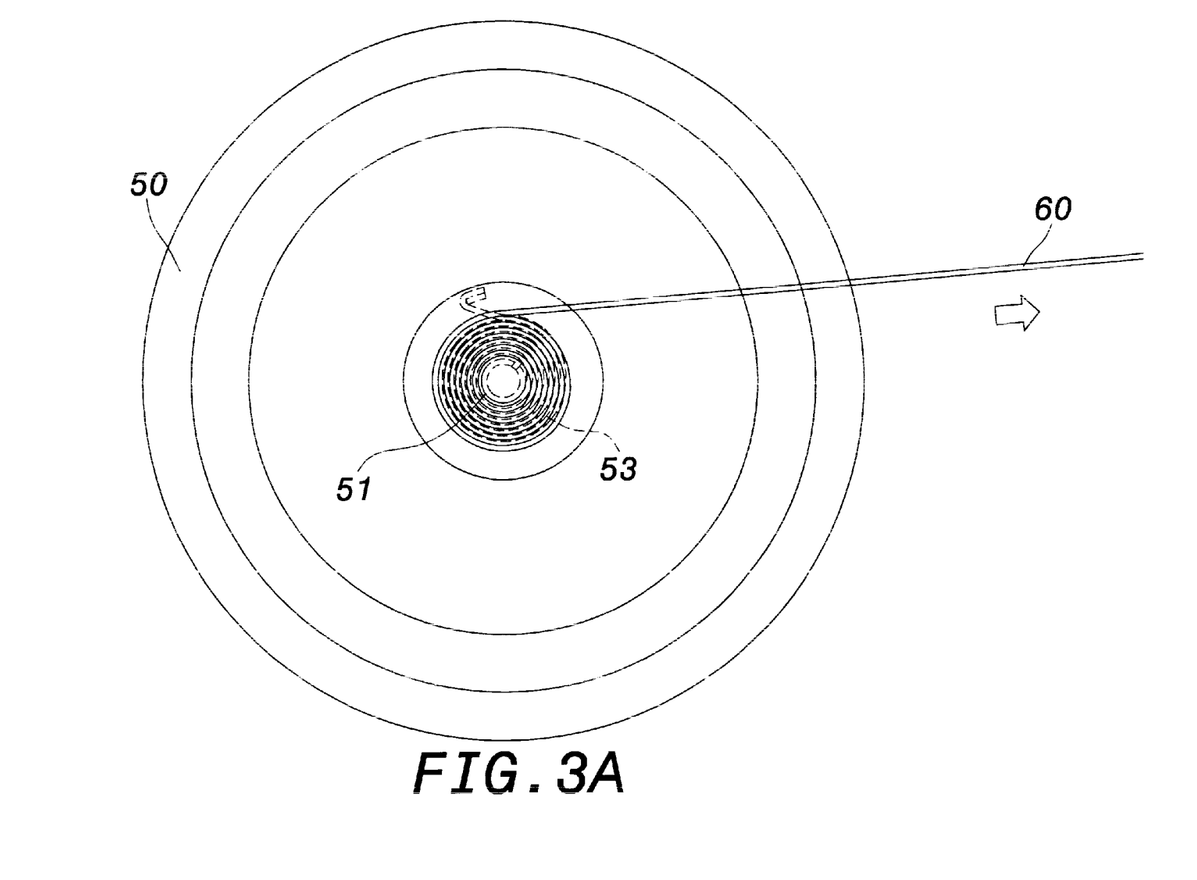
FIG. 3A is a schematic diagram showing a pulling state of the flexible device.
Figure 3B:
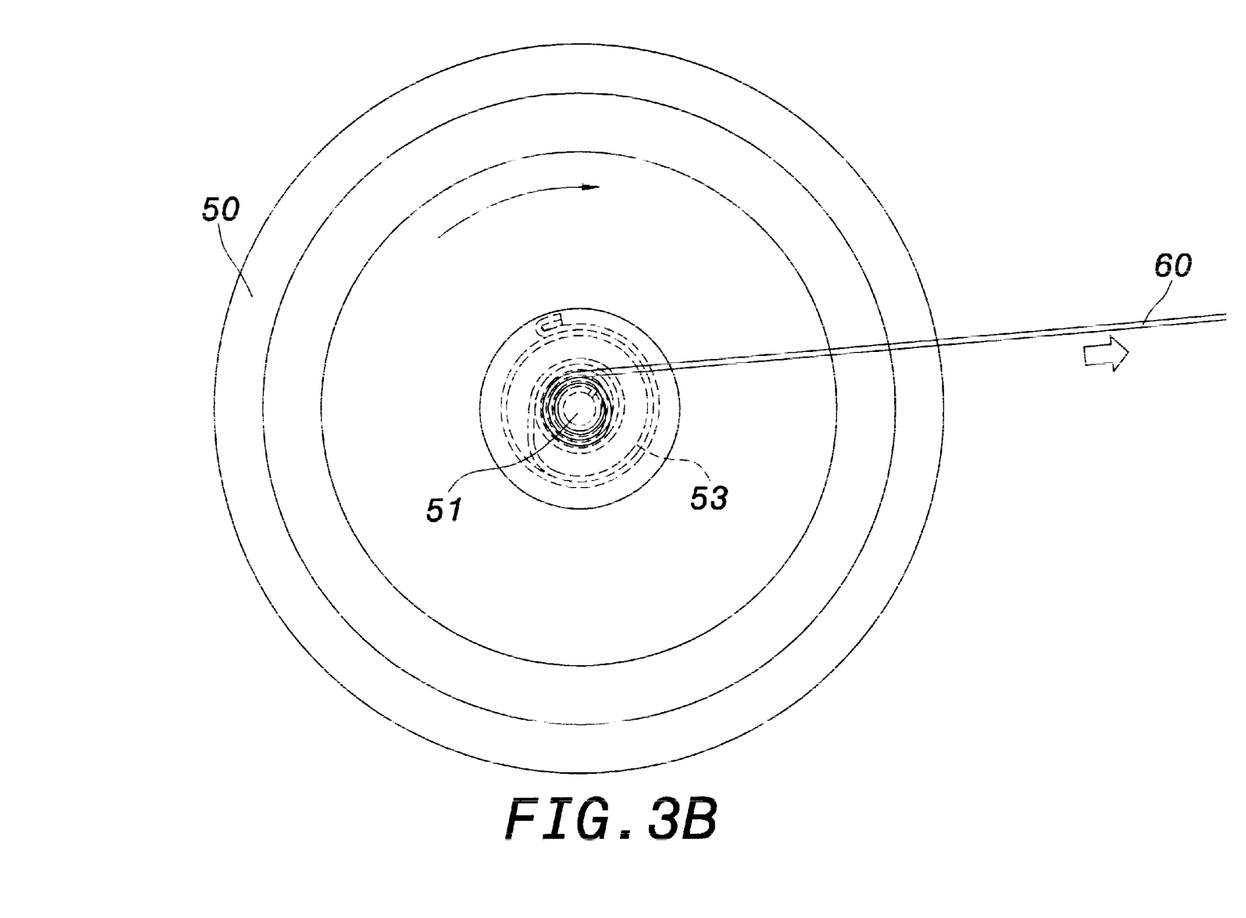
FIG. 3B is a schematic diagram showing a swirling state of the flexible device.
Figure 4:
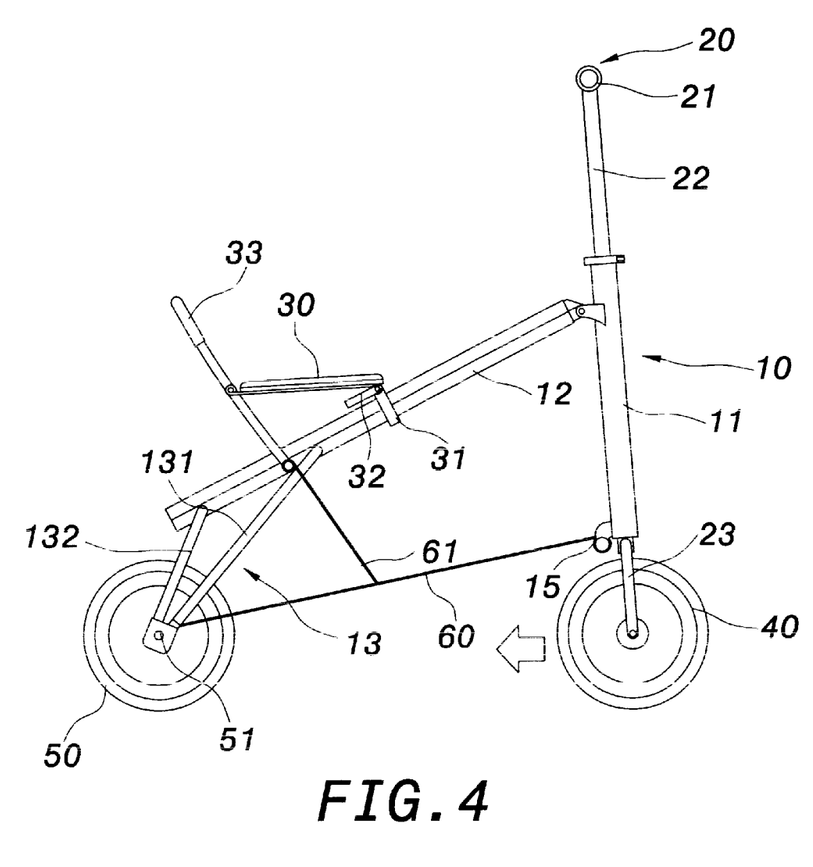
FIG. 4 is a side view of this invention.

Please refer to FIG. 3 to FIG. 4. As shown in FIG. 3, when a rider sits on the seat 30 with his or her two hands pulling the two handle bars 21 of the handle 20 backwards, and, in one breath, pushing the foot bar 15 at the bottom of the head tube 11 forwards by his or her feet, the distance between the front wheel 40 and the rear wheel 50 increases. By doing this, as shown in FIG. 3A and FIG. 3B, the flexible belt 60 is stretched out from an initial swirled state, thereby driving the rear pivot shaft 51 to move forwards, or in one aspect, rotate in a clockwise direction from the view of FIG. 1. The rear pivot shaft 51 will drive the rear wheel to rotate in the same direction by means of the one-direction drive mechanism 52.

Figure 4A:
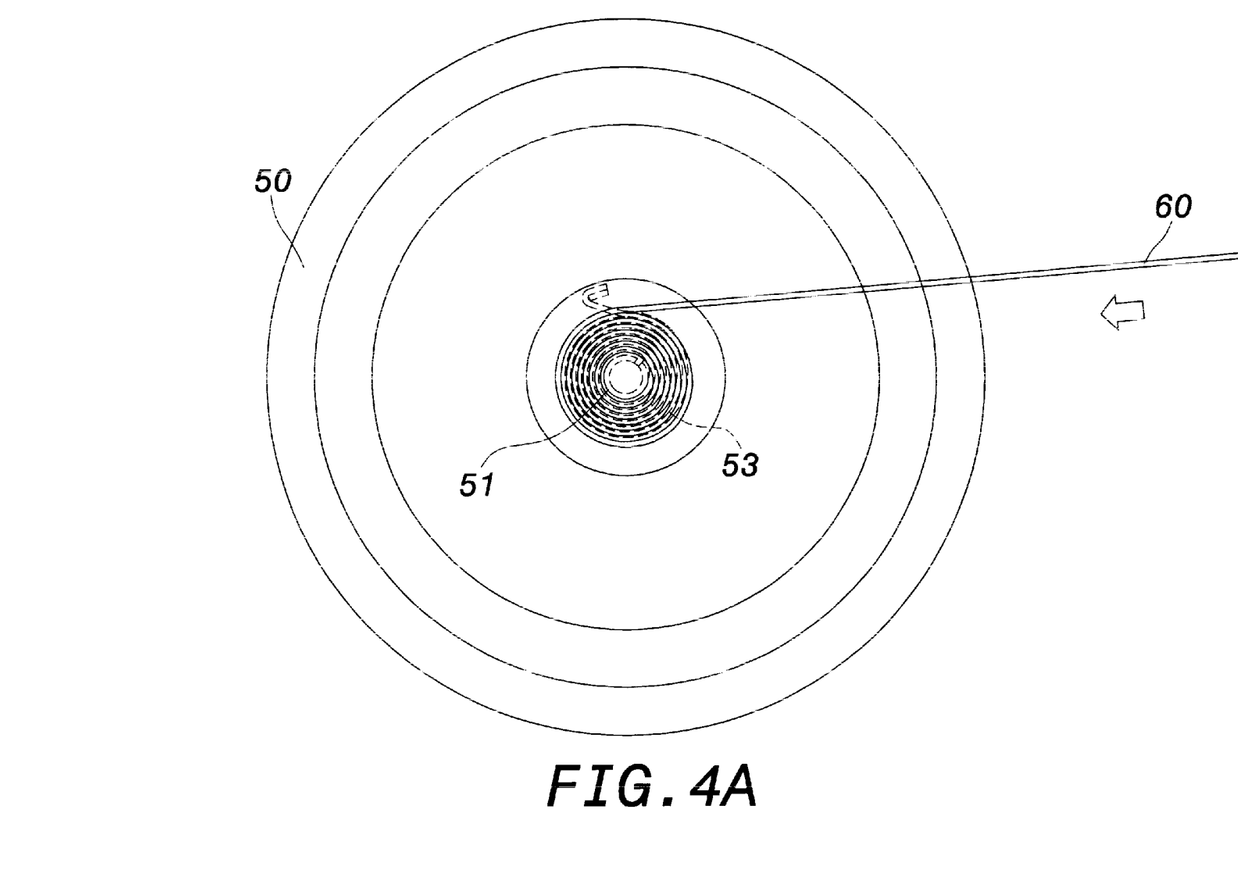
FIG. 4A shows the working of the flexible device.

As shown in FIG. 4, when the rider pushes the handle bars 20 forwards, and, at the same time, releases the pushing force exerted on the foot bar 15, the distance between the front wheel 40 and the rear wheel 50 decreases. By doing so, the flexible belt 60 re-wraps the rear pivot shaft 51 by the force provided by the swirling spring 53 and drives the rear pivot shaft 51 to rotate in a reverse direction, as best shown in FIG. 4A. It should be noted that when the rear pivot shaft 51 rotates in the reverse direction as mentioned, it does not drive the rear wheel 50 to rotate in the same reverse direction. In other words, the rear pivot shaft 51 is free-turning when swirling the flexible belt 60. By repeating the motion described above, the rider is able to strengthen his or her upper portion and also lower portion of his or her body, when he or she rides the bicycle trainer of this invention to his destination.

It is advantageous that the bicycle trainer of the present invention is a combination of a bicycle for transportation and an excellent excise machine. It can save people a great deal of money, when one needs to work out and he or she also needs a bicycle.

Figure 5:
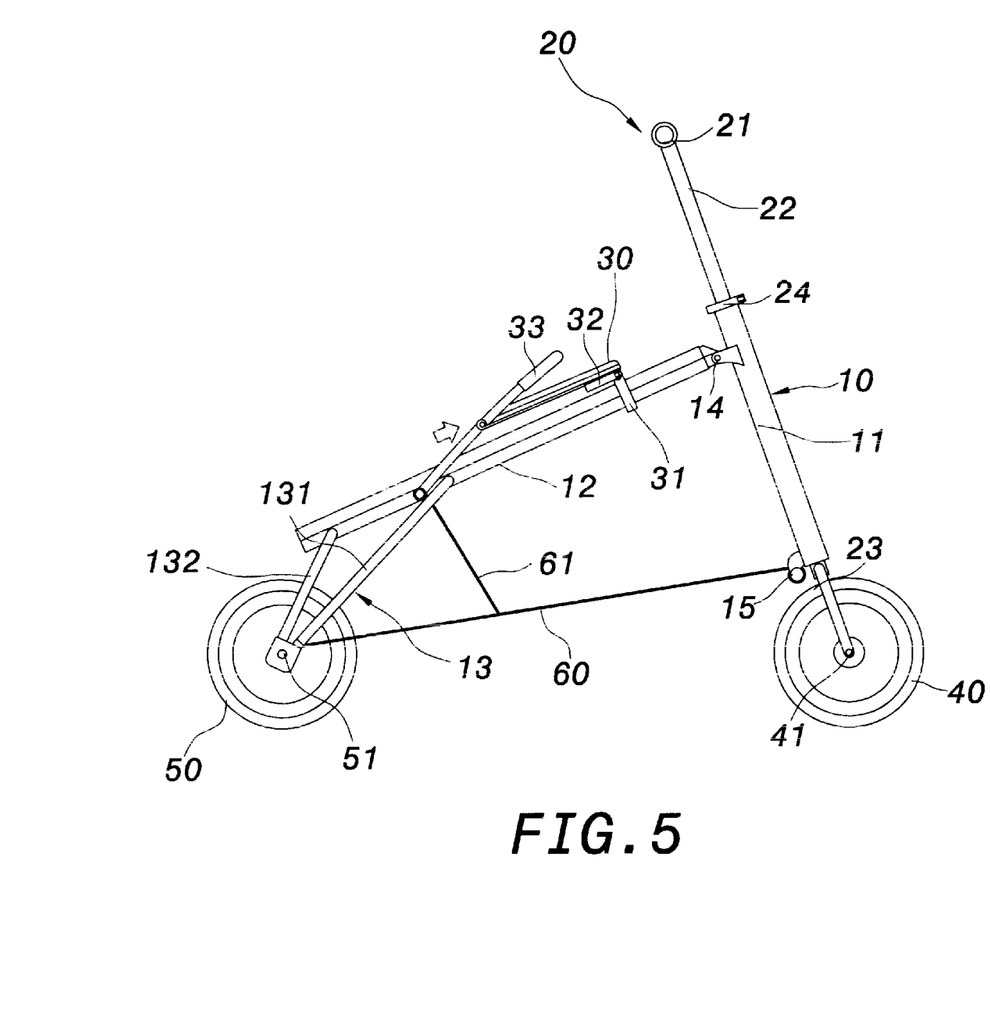
FIG. 5 to FIG. 7 illustrate the operations of the foldable bicycle trainer of this invention.
Figure 6:
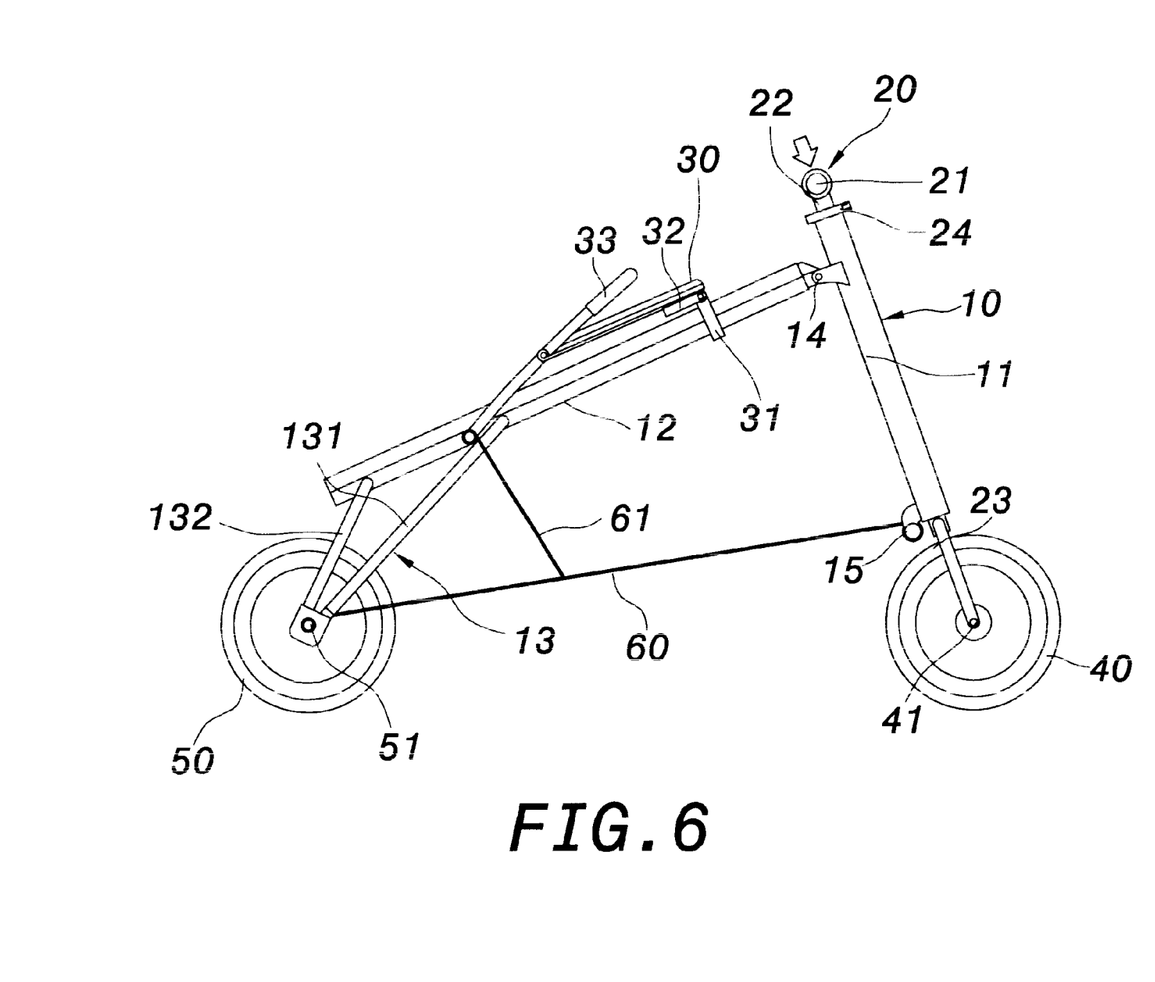
Figure 7:
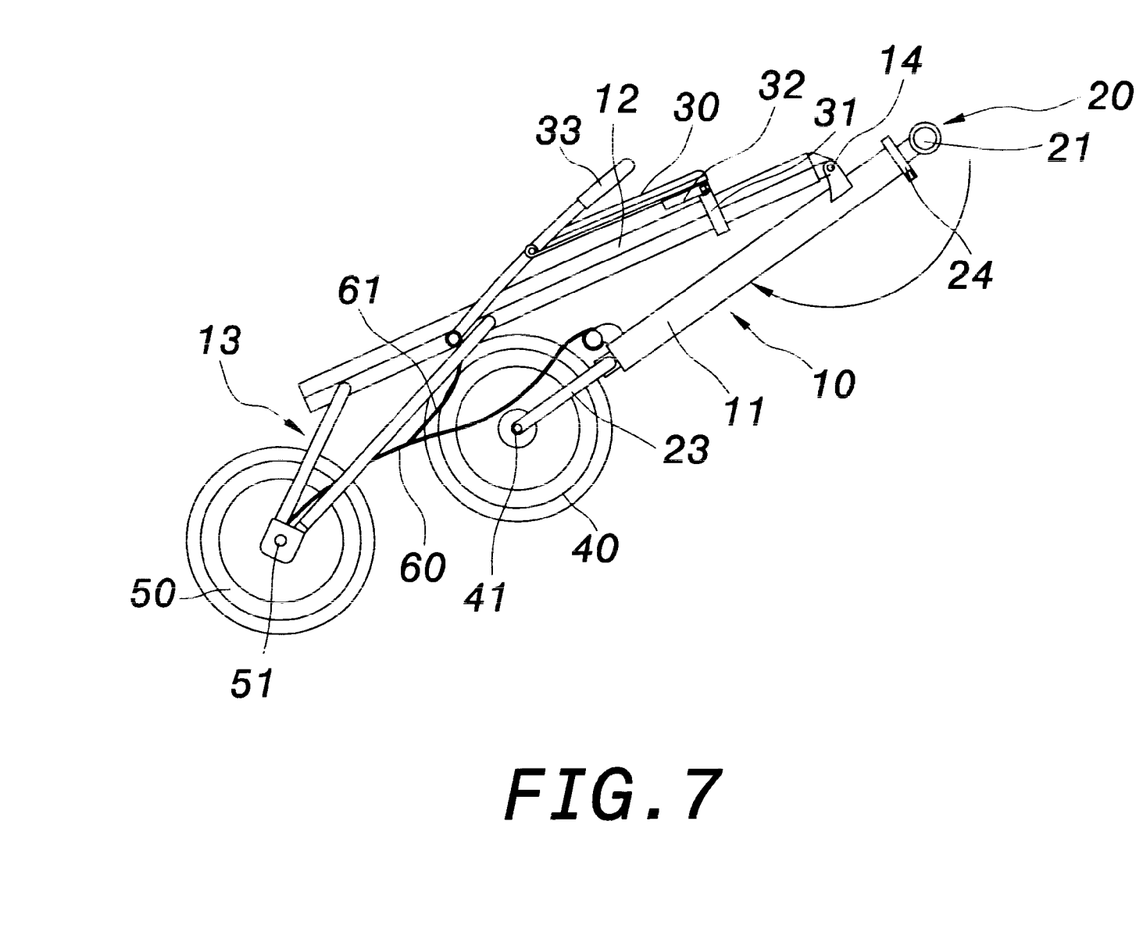

Please refer to FIG. 5 to FIG. 7. According to the present invention, the bicycle trainer is foldable. First, the fast-disassembly device 32 is loosened. The sliding sleeve assembly 31 slides along the length of the top tube 12 forwards. By doing so, the seat 30 and the back support structure 33 lean against the top tube 12, as best seen in FIG. 5. Thereafter, the fast-disassembly device 24 is loosenned, and the connecting rod is inserted lengthwise into the head tube 11 of the frame 10, as shown in FIG. 6. Finally, as shown in FIG. 7, the front wheel 40 carried by the front fork 23 and the head tube 12 is folded by using the front pivot shaft 14 as a fulcrum point.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A bicycle trainer comprising:
    a frame having a handle and a seat mounted thereon;
    a front wheel and a rear wheel connected to the frame, wherein a distance between the front wheel and rear wheel is changeable; and
    a flexible device connecting the frame with a rear pivot shaft at one side of the rear wheel, wherein the flexible device drives the rear wheel to rotate and is recovered by using a swirling spring installed beside the rear wheel.

2. The bicycle trainer of claim 1 further comprising a one-direction drive mechanism mounted between the rear pivot shaft and the rear wheel, which only drives the rear wheel to rotate in a forwardly moving direction.

3. A bicycle trainer comprising:
    a frame comprising a head tube, a top tube, and a rear fork, wherein a foot bar and a front fork are mounted at a lower part of the head tube, a front part of the top tube is pivotally connected to the head tube, and the rear fork is connected to the top tube;
    a handle connected to the head tube of the frame and connected to the front fork;
    a seat mounted at a position over the top tube of the frame;
    a front wheel and a rear wheel respectively having a front pivot shaft connected to the front fork, and a rear pivot shaft connected to the rear fork, wherein a one-direction drive mechanism is mounted between the rear pivot shaft and the rear wheel, which only drives the rear wheel to rotate in a forwardly moving direction; and
    a flexible device having two ends, one end thereof connecting to the head tube of the frame, and the other end thereof connecting to the rear pivot shaft of the rear wheel, wherein the flexible device drives the rear wheel to rotate and is recovered by using a swirling spring installed beside the rear wheel.

4. The bicycle trainer of claim 3 wherein the rear fork consists of two U-shaped rod bodies, wherein a rear end of the top tube is connected to upper portions of the rod bodies.

5. The bicycle trainer of claim 3 wherein the handle has two handle bars and a connecting rod connected therebetween, the connecting rod being inserted into the head tube of the frame, and wherein near the upper end of the head tube, a fast-disassembly device, which is capable of properly positioning the connecting rod on the head tube, is provided.

6. The bicycle trainer of claim 3 wherein the a sliding sleeve assembly is fixed on a bottom surface of the seat, and wherein the sliding sleeve assembly slides along the length of the top tube of the frame, and wherein a fast-disassembly device is provided on the sliding sleeve assembly and a back support structure is pivotally connected with a rear side of the seat.

7. The bicycle trainer of claim 3 wherein the flexible device is an elastic belt.

8. The bicycle trainer of claim 3 wherein a positioning device is provided between the flexible device and the top tube of the frame.

* * * * *